(12) United States Patent
Barbet et al.

(10) Patent No.: US 10,266,715 B2
(45) Date of Patent: *Apr. 23, 2019

(54) LIQUID COMPOSITION, ESPECIALLY INK COMPOSITION, FOR PRINTING WITH A BINARY DEFLECTED CONTINUOUS JET, WITH NON-CHARGED DROPS, USE OF SAID COMPOSITION, MARKING METHOD AND MARKED SUBSTRATE

(71) Applicant: Dover Europe Sàrl, Vernier (CH)

(72) Inventors: Bruno Barbet, Etoile-sur-Rhône (FR); Jean-François Desse, Guilherand Granges (FR); Pierre De Saint Romain, Valence (FR); Daniel Esteoulle, Toulaud (FR); Philippe Tenaud, la Combe de Lancey (FR)

(73) Assignee: DOVER EUROPE SÀRL, Vernier (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,559

(22) Filed: Aug. 17, 2017

(65) Prior Publication Data

US 2017/0342292 A1 Nov. 30, 2017

Related U.S. Application Data

(63) Continuation of application No. 14/855,659, filed on Sep. 16, 2015, now Pat. No. 9,783,695.

(30) Foreign Application Priority Data

Sep. 16, 2014 (FR) ...................................... 14 58747

(51) Int. Cl.
| C09D 11/30 | (2014.01) |
| C09D 11/52 | (2014.01) |
| C09D 11/322 | (2014.01) |
| C09D 11/328 | (2014.01) |
| C09D 11/36 | (2014.01) |

(52) U.S. Cl.
CPC .............. C09D 11/52 (2013.01); C09D 11/30 (2013.01); C09D 11/322 (2013.01); C09D 11/328 (2013.01); C09D 11/36 (2013.01)

(58) Field of Classification Search
CPC ....... C09D 11/30; C09D 11/36; C09D 11/322; C09D 11/328; C09D 11/52
See application file for complete search history.

(56) References Cited

U.S. PATENT DOCUMENTS

| 5,744,519 | A | 4/1998 | Heraud |
| 6,869,986 | B1 | 3/2005 | Millot |
| 7,192,121 | B2 | 3/2007 | Barbet |
| 8,162,450 | B2 | 4/2012 | Barbet |
| 8,540,350 | B2 | 9/2013 | Barbet |
| 2005/0113481 | A1 | 5/2005 | Sabys |
| 2007/0248838 | A1 | 10/2007 | De Saint-Romain |
| 2010/0028632 | A1 | 2/2010 | Goustiaux |
| 2013/0307891 | A1 | 11/2013 | Barbet |
| 2014/0050868 | A1 | 2/2014 | De Saint-Romain |
| 2014/0065381 | A1 | 3/2014 | De Saint Romain |
| 2014/0168322 | A1 | 6/2014 | Bonneton |
| 2015/0152273 | A1 | 6/2015 | Caillier |
| 2015/0368486 | A1 | 12/2015 | De Saint-Romain |
| 2015/0376430 | A1* | 12/2015 | Insulaire ................ C09D 11/36 428/35.7 |
| 2016/0272827 | A1* | 9/2016 | Goustiaux ............ C09D 11/102 |
| 2017/0190926 | A1* | 7/2017 | De Saint-Romain ...... B41J 2/02 |

FOREIGN PATENT DOCUMENTS

| EP | 0 851 011 A2 | 7/1998 |
| FR | 2 851 495 A1 | 8/2004 |
| FR | 2 906 755 A1 | 4/2008 |
| FR | 2 912 414 A1 | 8/2008 |
| FR | 2 952 851 A1 | 5/2011 |
| FR | 2 971 199 A1 | 8/2012 |
| FR | 2 972 457 A1 | 9/2012 |
| FR | 2 974 811 A1 | 11/2012 |
| FR | 2 975 632 A1 | 11/2012 |
| FR | 2 992 324 A1 | 12/2013 |
| FR | 3 001 733 A1 | 8/2014 |
| WO | 2005/070676 A2 | 8/2005 |
| WO | 2006/097502 A1 | 9/2006 |
| WO | 2008/040777 A1 | 4/2008 |
| WO | 2011/061331 A1 | 5/2011 |
| WO | 2012/163830 A1 | 6/2012 |
| WO | 2012/107461 A1 | 8/2012 |
| WO | WO 2014076181 A1 * | 5/2014 ........... C09D 11/102 |

OTHER PUBLICATIONS

Search Report issued in French Patent Application FR 14 58747 dated May 5, 2015.
U.S. Appl. No. 14/763,927, "Ink Composition for Liquid Jet Printing" filed Jul. 28, 2015.
Search Report issued in European Patent Application No. EP 15 18 5410 dated Jan. 15, 2016.

* cited by examiner

Primary Examiner — Veronica F Faison
(74) Attorney, Agent, or Firm — Pearne & Gordon LLP

(57) ABSTRACT

A liquid composition, including a solvent, for printing with a binary deflected continuous jet printing technique, wherein upon printing the liquid composition form drops that are each: not charged by an electric field, have a zero electric charge, form a dipole under the effect of an electric field, and are then deflected by the electric field. The liquid composition has all the following characteristics: a conductivity at 20° C. from 5 to 500 µS/cm, still preferably a conductivity at 20° C. from 5 to 500 µS/cm, the value of 500 µS/cm being excluded, better a conductivity at 20° C. from 5 to 400 µS/cm, still better a conductivity at 20° C. from 30 to 400 µS/cm, for example from 30 to 200 µS/cm; a dynamic viscosity at 20° C. from 1 to 25 cPs, preferably from 6 to 25 cPs; and a density from 0.8 to 2.5 g/cm3, preferably from 1.2 to 2.5 g/cm3.

34 Claims, No Drawings

LIQUID COMPOSITION, ESPECIALLY INK COMPOSITION, FOR PRINTING WITH A BINARY DEFLECTED CONTINUOUS JET, WITH NON-CHARGED DROPS, USE OF SAID COMPOSITION, MARKING METHOD AND MARKED SUBSTRATE

TECHNICAL FIELD

The invention relates to a liquid composition (composition of liquid), such as an ink composition for treating and/or marking substrates, supports and objects of any kinds, the properties of which are specifically adapted to the treatment, and/or to the marking or to the printing, by the printing technique with a binary deflected continuous liquid jet, with non-charged drops, on a very wide variety of supports, substrates and objects.

More specifically, this printing technique with a binary deflected continuous jet is a technique in which the liquid composition forms upon printing, drops which are not charged by an electric field, which each have zero electric charge, which each form a dipole under the effect of an electric field, and which are then deflected by said electric field.

For convenience, this printing technique will be designated in the following by «SPI» technique.

The invention also relates to the use of this liquid composition, such as an ink composition, according to the invention, in a printer or a printing head applying the printing technique with a liquid jet, notably with an ink jet, a so-called «SPI» technique, The invention further relates to a method for treating and/or marking a substrate, support, or object by projection on this substrate, support or object, of said liquid composition such as an ink composition with the printing technique with a liquid jet, a so-called «SPI» technique.

The invention finally relates to a substrate, support or object provided with a marking or treatment obtained by drying and/or absorption of the liquid composition such as an ink composition according to the invention.

The technical field of the invention is generally that of printing with a liquid jet, notably with an inkjet.

STATE OF THE PRIOR ART

Ink jet printing is a well known technique, which allows the printing, the marking or the decoration of any kinds of objects, at a high rate, and without contact of these objects with the printing device, of messages variable at will, such as bar codes, sell-by dates, etc. and this even on non-planar supports.

Printing techniques with an ink jet are divided into two main types: i.e. the so called «drop-on-demand» («DOD») technique, and the so-called «continuous ink jet» («CIJ») technology.

The projection with a «drop-on-demand» jet may be ensured by an inkjet, a so called «bubble ink jet», by a so-called «piezoelectric» inkjet, by a so-called «valve inkjet» or finally with a so-called «hot melt» inkjet or with a phase transition.

In the case of the bubble ink jet, the ink is vaporized in the vicinity of the nozzle and this vaporization causes the ejection of a small amount of ink located between the resistor which vaporizes the ink and the nozzle. In the case of the piezoelectric inkjet, a sudden pressure variation caused by an actuator set into motion by the electric excitation of a piezoelectric crystal or ceramic and located in the vicinity of the nozzle, causes the ejection of an ink droplet.

In the case of the «hot melt» inkjet, the ink is without any solvent and is brought to beyond its melting point.

The drop-on-demand printing may therefore be carried out at room temperature, this is the case of the piezoelectric inkjet, of the valve inkjet or the bubble inkjet, or at a high temperature, for example from about 60° C. to 130° C., this is the case of the so-called «hot melt» (HM) inkjet or with a phase transition. The projection by a deflected continuous jet consists of sending pressurized ink into a cavity containing a piezoelectric crystal, from which the ink escapes through an orifice (nozzle) in the form of a jet. The piezoelectric crystal, vibrating at a determined frequency, causes pressure perturbations in the inkjet, which oscillates and gradually breaks into spherical drops. An electrode, a so-called «charging electrode», placed on the path of the jet, where it breaks, gives the possibility of giving these drops an electrostatic charge, if the ink is conductive. The thereby charged drops are deflected in an electric field and allow printing. The non-charged drops, therefore not deflected, are recovered in a gutter where the ink is sucked up, and then recycled towards the ink circuit.

For all the types of inkjet technology, the viscosity of the inks is very low at the projection temperature, typically from 1 to 20 cPs and these technologies may therefore be described as technologies for depositing low viscosity ink.

Projection of ink with a jet ensures contactless marking at a high running rate over objects which are not necessarily planar and with the possibility of changing messages at will. The ink compositions, suitable for projection with a jet, should meet a certain number of criteria inherent to this technique, relating, inter alia, to the viscosity, the solubility in a solvent for the cleaning, the compatibility of the ingredients, proper wetting of the supports to be marked, etc., and electric conductivity in the case of the deflected continuous jet.

Further, these inks should dry rapidly, be capable of flowing or of remaining still in the vicinity of the nozzle without blocking it, with great stability of orientation of the jet while allowing easy cleaning of the printing head.

The ingredients which make up present inks, for the inkjet of the deflected continuous jet type, are organic or mineral products; these are coloring materials, such as coloring agents or pigments, resins or binders, in more or less volatile solvent(s) or in water, optionally one or several salts providing conductivity, as well as various additives.

The ingredients which make up present inks for the inkjet of the drop-on-demand (DOD) type are also organic or mineral products; coloring agents or pigments, resins or binders, in solvent(s) which are more or less volatile or in water, in proportions other than those of the inks for deflected continuous ink jet, but without the requirement of electric conductivity.

In the case of inks for the «hot melt» inkjet, the inks do not contain any liquid solvents at room temperature but liquid organic products at the projection temperature already specified above, such as waxes and resins of low molecular mass. These waxes and resins of low molecular mass are generally selected so that the viscosity of the ink at the projection temperature is from 2 to 25 mPa·s.

A printing technique with a liquid jet notably an inkjet which we shall call conveniently in the following, and in order to avoid repetitions, an «SPI» technique which is the acronym of «super piezo inkjet» has been developed recently.

This «SPI» technique is both different from the so-called «drop-on-demand» technique and from the so-called «continuous inkjet» (CIJ) technology.

The «SPI» technique may be defined, for simplification, as a printing technique with a binary CIJ deflected continuous jet in which, unlike the printing technique with a deflected continuous jet where the projected printing drops each have a non-zero net electric charge, the drops are not charged with an electric field, each have a zero net electric charge and each form a dipole under the effect of an electric field, and are then deflected by this field.

By «binary», is meant:
that there exists a first trajectory of the drops for printing, and a second trajectory of the drops for recycling the ink. In this second trajectory of the drops, the drops are recovered in a gutter where the ink is sucked up and then recycled towards the ink circuit
that a message with a height of N pixels requires a printing head with N nozzles.

It is important to note that, while in the printing technique with a "CIJ" deflected continuous jet, these are deflected drops which are printed, in the so called "SPI" technique these are on the contrary non-deflected drops which are printed.

The «SPI» technique is thus widely described in the following documents [1] and [2] to which reference is made here explicitly and which are introduced into the present description in their entirety:

Document WO-A2-2005/070676 (corresponding to documents FR-A1-2 851 495 and U.S. Pat. No. 7,192,121 B2) [1], describes how to form drops in this technique by means of a printing head provided with an internal stimulation system.

More specifically, this document according to its claim 1 refers to an inkjet printer comprising:
a printing head with one or several nozzles having an accommodating head body notably for each nozzle,
a hydraulic path of the ink including, a stimulation chamber in hydraulic communication with one of the printing nozzles emitting an inkjet under pressure along an axis of this nozzle,
internal means for stimulating the inkjet emitted by the nozzle mechanically coupled with the ink accommodated in the stimulation chamber, these means acting on the jet emitted by the nozzle for controllably breaking up the jet, and
means for recovering the ink which is not received by a printing substrate,
a generator of electric control signals receiving a control signal and delivering to the stimulation means, stimulation signals,
an arrangement of charging electrodes defining around the axis of the nozzle upstream and downstream areas, the downstream area being further away from the nozzle than the upstream area, upstream and downstream electrodes of this layout being connected to electric potential sources so as to maintain in one of the areas a potential equal to that of the ink found in the body of the printing head, and in the other one of these areas a potential different from that of the ink found in the body of the printing head,
a layout of deflection electrodes axially located downstream from the layout of charging electrodes,
characterized in that the generator of electric control signals delivers by means of stimulation of the signals causing controlled breaking up of the jet intermittently in an upstream breaking up position located in the upstream area, in order to intermittently form a droplet, thus separating the jet into a droplet and a segment and also causing controlled breaking up of the jet or of segments of the jet continuously in a downstream breaking up position, the continuous jet emitted by the nozzle thus being transformed after the downstream area into a continuous sequence of electrically charged and non-charged ink drops.

This document further relates, according to its claim 13, to a method for printing on a support by means of said printer in which an inkjet emitted by a nozzle of the printer is fractionated in order to form first drops which will hit a substrate in order to form points and segments,
characterized in that,
the jet and the segments resulting from the fractionation of the jet into first drops and segments into second drops, are further fractionated, the second drops resulting from this last fractionation being directed towards the gutter.

This document finally according to its claim 14 relates to an inkjet printer head comprising:
a printing head with one or several nozzles having an accommodating head body (1) notably for each nozzle,
a hydraulic path of the ink including a stimulation chamber in hydraulic communication with one of the printing nozzles emitting an inkjet under pressure along an axis of this nozzle,
internal means for stimulating the inkjet emitted by the nozzle mechanically coupled with the ink accommodated in the stimulation chamber, these means acting on the jet emitted by the nozzle in order to break up the jet in a controlled way, and
means for recovering the ink which is not received by a printing substrate,
a generator of electric control signals receiving a control signal and delivering to the stimulation means, stimulation signals,
a layout of charging electrodes defining around the axis of the nozzle of the upstream and downstream areas, the downstream area being further away from the nozzle than the upstream area, upstream and downstream electrodes of this layout being connected to electric potential sources so as to maintain in one of the areas a potential equal to that of the ink found in the body of the printing head, and in the other one of these areas, a potential different from that of the ink found in the body of the printing head,
a deflection electrode layout axially located downstream from the charging electrode layout
characterized in that the generator of electric control signals delivers to the means for stimulating the signals causing controlled breaking up of the jet intermittently in an upstream breaking up position located in the upstream area, and also causing controlled break up of the jet or of segments of the jet continuously in a downstream breaking-up position, the continuous jet emitted by the nozzle then being transformed after the downstream area into a continuous sequence of electrically charged and non-charged drops.

Document FR-A1-2 906 755 (corresponding to documents WO-A1-2008/040777 and U.S. Pat. No. 8,162,450 B2) [2], describes how the drops are sorted in this technique under the effect of a variable field.

More specifically, this document according to its claim 1 relates to a method for deflecting a liquid jet comprising:
the formation of a conductive liquid jet leaving at a predetermined velocity (v) a nozzle of a pressurized chamber along a hydraulic trajectory (A), the generation of a variable electric field (E) along the hydraulic trajectory (A) by setting under a potential a succession, in the direction of the hydraulic trajectory (A), of several deflection electrodes insulated from each other and forming a network which extends along a plane of electrodes parallel to the hydraulic trajectory (A) on a network length (L), wherein the potential applied to each electrode of the network is variable and the potential applied to the whole of the electrodes of the network have zero space and time averages, the deflection of the jet by the electric field (E) by mobilization of charges within the jet.

Improvements to the technique which is the subject of documents [1] and [2] are described in documents [3], [4], and [5] which follow, to which reference is explicitly made here and which are introduced into the present description in their entirety.

Document FR-A1-2 952 851 (corresponding to documents WO-A1-2011/061331 and U.S. Pat. No. 8,540,350 B2) [3], describes how to avoid interactions between neighboring nozzles by compensating for mechanical cross-talk.

More specifically, this document relates to a printer with a continuous ink jet comprising a printing head which is characterized in that it comprises means for compensating mechanical cross-talk between adjacent chambers, these means simultaneously transmitting to the transmission towards a stimulated chamber, of a stimulation pulse, a pulse for compensating mechanical cross-talk on each of the lines serving an actuator of a chamber adjacent to the stimulated chamber.

In particular, claim 1 of this document relates to a printer with a continuous inkjet comprising a printing head comprising:

- a plurality of stimulation chambers, aligned along an alignment axis of the chambers,
- a planar diaphragm, the portions of which form a wall of each of the stimulation chambers,
- a plurality of nozzles each being respectively in hydraulic communication with one of the stimulation chambers,
- at least one charging electrode and one deflection electrode located downstream from the nozzles,
- a plurality of electromechanical actuators each being mechanically bound respectively to each of the diaphragm portions forming a wall of each of the stimulation chambers,
- a plurality of stimulation lines each intended for transmitting stimulation pulses towards each of the various actuators, respectively,
- a device for processing data to be printed receiving a carrier signal carrying data to be printed and delivering depending on these data stimulation pulses to the stimulation lines, characterized in that it further comprises means for compensating mechanical cross-talk between adjacent chambers, these means simultaneously transmitting to the transmission towards a stimulated chamber, a stimulation pulse on a stimulation line, a compensation pulse for mechanical cross-talk on each of the lines serving an actuator of the chamber adjacent to the stimulated chamber.

This document also according to its claim 2, relates to a printing head of a printer with a continuous ink jet comprising:

- a plurality of stimulation chambers, aligned along an alignment axis of the chambers,
- a planar diaphragm for which portions form a wall of each of the stimulation chambers,
- a plurality of nozzles being each respectively in hydraulic communication with one of the stimulation chambers,
- at least one charging electrode and a deflection electrode located downstream from the nozzles,
- a plurality of electromechanical actuators each being mechanically bound to each of the diaphragm portions, respectively, forming a wall of each of the stimulation chambers,
- a plurality of stimulation lines each intended for transmitting stimulation pulses towards each of the different actuators respectively, characterized in that it further comprises means for compensating for mechanical cross-talk between adjacent chambers, these means simultaneously transmitting to the transmission to a stimulated chamber, a stimulation pulse on a stimulation line, a pulse for compensating for mechanical cross-talk on each of the lines serving an actuator of a chamber adjacent to the stimulated chamber.

This document according to its claim 7, finally relates to a method for reducing the consequences of mechanical cross-talk between adjacent stimulation chambers of a printing head of a continuous inkjet printer including a planar diaphragm, portions of which form a wall of each of the stimulation chambers, at least one charging electrode and one deflection electrode located downstream from the nozzles, and electromechanical stimulation actuators of each chamber and a plurality of stimulation lines each intended to transmit stimulation pulses towards each of the various actuators, characterized in that simultaneously with the sending of a stimulation pulse towards an actuator of a stimulated chamber, compensation pulses are sent towards each of the chambers adjacent to the stimulated chamber, towards each of the actuators of a chamber adjacent to the stimulated chamber.

Document FR-A1-2 971 199 (corresponding to documents WO-A1-2012/107461 and US-A1-2013/307891) [4], describes a method for controlling printing in which a change in the polarity between two neighboring nozzles is carried out.

More specifically, this document according to its claim 1, describes a method for controlling printing of a binary continuous inkjet printer provided with a printing head, or of a printing head of such a printer in order to print a pattern on a printing support by displacement with respect to the head, the head comprising:

- a so-called multi-nozzle droplet generator comprising:
  - a body including:
    - stimulation chambers each able to receive pressurized ink,
    - ejection nozzles, each in communication with a stimulation chamber and each able to eject an inkjet along its longitudinal axis, the nozzles being aligned along an alignment axis and laid out in a same plane,
  - actuators, each mechanically coupled with a stimulation chamber and able to cause upon a pulse command a breaking up of a jet ejected by a nozzle in communication with said chamber at a distance Lbr from the plane of the nozzles,
- a deflection assembly laid out underneath the nozzles and including from the upstream side to the downstream side:
  - a shielding electrode,
  - a first dielectric layer adjacent to the shielding electrode,
  - at least one pair of deflection electrodes, each deflection electrode being surrounded on either side by a dielectric layer, a method according to which:
pieces of information on the relative position of the support with respect to the head are determined,
the electrodes of a same pair are powered with an alternating voltage in phase opposition between each other,
pulses are sent to the actuators in order to form, from the breaking up of a jet ejected by a nozzle in communication with the chamber to which is mechanically coupled said actuator at a distance Lbr from the plane of the nozzles, drops not capable of being electrically charged by the deflection electrodes or jet segments subject to the electrostatic influence of the deflection electrodes,
the pulses are controlled so as to minimize the total electric charge on the jet segments, which is contained inside the electrostatic influence volume of the deflection electrodes.

This document also relates according to its claim 9, to a binary continuous ink jet printer for applying said control method.

Document FR-A1-2 975 632 (corresponding to documents WO-A1-2012/163830 and US-A1-2014/168322) [5] describes how to increase the printing rate from 2 to 10 m/s by means of the droplet generator.

More specifically, this document according to its claim 1, describes a printing method of a printer with multi-nozzles with a binary continuous inkjet or of a printing head of such a printer in order to print a pattern on a printing support by displacement with respect to the head, the head comprising:
a multi-nozzle droplet generator comprising
a body including:
one or several pressurized chambers each capable of receiving pressurized ink,
ejection nozzles in hydraulic communication with a pressurized chamber and each capable of ejecting an inkjet having a velocity Vj along its longitudinal axis (A), the nozzles being aligned along an alignment axis and laid out in a same plane,
actuators, able to cause upon a pulse command a breaking-up of a jet ejected by a nozzle in order to form a succession of drops,
a method according to which the support relatively to the head has a velocity Vs, the distance between consecutive pixels in the displacement direction of the support is Dii, and according to which, by breaking-up the jet, drops of a first category and drops of a second category are formed, the drops of the first category each having a first volume, all the first volumes being substantially equal to each other, the drops of second category having second volumes not necessarily equal to each other but all the drops of the second category having a volume which is not equal to the volume of a droplet of first category,
the trajectories followed by the drops of first and second categories are differentiated by applying to at least one of the droplet categories, a deflection force capable of differentiating the trajectories of the drops of first category and of the drops of second category, the trajectory of the drops of first category encountering the printing support and the trajectory of the drops of second category encountering a gutter for recovering these drops,
a piece of information relating to the instants when the successive pixels imprinted run past a position where they may be printed, is generated
for printing a black pixel followed by a white pixel, a drop of first category is formed and a droplet of second category is formed, the cumulative formation duration of these drops of first and second categories being equal or greater to the duration of the passage of a pixel.

No description of the specific inks applied in the printers, printing heads and methods of these documents nor any suggestion as to the criteria which should guide the selection of these inks exists in documents [1], [2], [3], [4] and [5].

Therefore, there exists a need for ink compositions and more generally for liquid compositions which are specifically adapted to the so-called «SPI» technique as defined above and which may notably be used in the processes, methods, printing heads and printers described in documents [1], [2], [3], [4] and [5], and explicitly discussed above in the present description.

The goal of the present invention is to meet this need inter alia and to provide liquid compositions which are specifically adapted to said so-called «SPI» technique, as defined above, and which may notably be used, applied, in the processes, methods and printers described in documents [1], [2], [3], [4] and [5] explicitly discussed above in the present description.

DISCUSSION OF THE INVENTION

This goal, and further other ones are achieved according to the invention, with a liquid composition, such as an ink composition, liquid at room temperature, comprising a solvent, said liquid composition being a liquid composition specifically for printing with a binary deflected continuous jet printing technique in which said liquid composition forms upon (during) printing drops which are not charged by an electric field, which each have a zero electric charge, which each form a dipole under the effect of an electric field, and which are then deflected by said electric field, characterized in that said liquid composition has (at the same time) all the following characteristics a), b) and c):

a) a conductivity at 20° C. from 5 to 500 µS/cm, still preferably a conductivity at 20° C. from 5 to 500 µS/cm, the value 500 µS/cm being excluded, better a conductivity at 20° C. from 5 to 400 µS/cm, still better a conductivity at 20° C. from 30 to 400 µS/cm, for example from 30 to 200 µS/cm;

b) a dynamic viscosity at 20° C. from 1 to 25 cPs, preferably from 6 to 25 cPs; and c) a density from 0.8 to 2.5 g/cm$^3$, preferably from 1.2 to 2.5 g/cm$^3$.

Let us specify that the electric conductivity is measured with a commercial instrument and according to the principle well known to one skilled in the art, for example described on the site: http://fr.wikipedia.org/wiki/Conductim%C3%A9trie.

Let us specify that the dynamic viscosity is_for example measured by means of a viscosimeter with coaxial cylinders.

The term of «liquid composition», «composition of liquid» covers both inks and liquids, so-called «functional liquids».

A functional liquid may be any liquid allowing deposition of a substance having a particular function, for example and without being exhaustive: a coloring, medicinal, waterproofing, fixing, refractory, conducting, insulating, anti-counterfeiting function, notably for pre-treatments and post-treatments of textiles.

It may generally be considered that a functional liquid is different from an ink by the fact that an ink is in principle colored, while a functional liquid is not necessarily colored.

The pre-treatments of the aforementioned textiles may be generally defined as treatments which are used for preparing the textile before printing, either for assisting with attachment, or for preventing it in certain locations. The post-treatments of the aforementioned textiles may be diverse and are well known to the man skilled in the art.

By «room temperature» is generally understood a temperature from 5° C. to 30° C., preferably from 10° C. to 25° C., still preferably from 15° C. to 24° C., better from 20° C. to 23° C. It is quite understood that the ink is liquid at atmospheric pressure.

The term of «binary» is well known in this field of technology and was clearly defined above.

The liquid composition according to the invention has simultaneously all the characteristics a), b), and c).

The liquid composition according to the invention is a liquid composition specifically for printing with a highly specific printing technique, i.e. a printing technique with a binary deflected continuous jet, wherein the liquid composition forms upon printing the drops which are not charged by an electric field, each have a zero electric charge, each form a dipole under the effect of an electric field, and are then deflected by said electric field.

This technique is designated by «SPI» conveniently.

The liquid composition according to the invention is a composition for any SPI technique, i.e. for all the processes, methods of «SPI», and it may be applied in all printers and printing heads operating according to this technology.

Thus, it is specifically indicated that the liquid composition according to the invention is a composition for the processes, methods, printers and printing heads as described in documents [1], [2], [3], [4] or [5] mentioned above; for the processes, methods, printers and printing heads of these documents as they are explicitly discussed above herein; and for any process, method, printer or printing head defined by the combination of the characteristics of at least two processes, methods, printers or printing heads as described in documents [1], [2], [3], [4] or [5] described above; or defined by the combination of at least two processes, methods, printers or printing heads as explicitly discussed above herein. As a combination, mention may be made of the combination of documents [1] and [2] or documents [1] and [2] and of one or several from among the documents [3] to [5].

This means that the ink composition according to the invention is intrinsically formulated for printing with this specific «SPI» technique and that it is therefore intrinsically different from a liquid composition for the «DOD» printing technique or the conventional «CIJ» printing technique, i.e. a CIJ technique.

More exactly, the liquid composition according to the invention is first of all a liquid composition for printing with a printing technique with a «CIJ» deflected continuous jet, and from this simple fact, it is clearly different from a liquid composition for printing with a drop-on-demand «DOD» printing technique.

Next, the liquid composition according to the invention forms upon printing the drops which are not charged by an electric field, each have a zero electric charge, each form a dipole under the effect of an electric field, while the compositions for the standard «CIJ» technique form charged drops.

Finally, the liquid composition according to the invention is printed by using an electric field for deflecting the drops, which there again makes it clearly different from a liquid composition for the DOD technique.

The liquid composition according to the invention is characterized in that it further has simultaneously all the characteristics a), b), and c).

It was found that the liquid composition according to the invention, which has all these three characteristics was particularly well suited for the specific printing technique so called «SPI» technique defined above.

These characteristics further differentiate the liquid composition according to the invention from the liquid compositions for the «DOD» printing technique or the standard «CIJ» printing technique and give the liquid composition according to the invention advantageous properties as compared with liquid compositions for the "DOD" printing technique or the «CIJ» printing technique.

Thus, the liquid composition according to the invention has a conductivity at 20° C. from 5 to 500 µS/cm, still preferably a conductivity at 20° C. from 5 to 500 µS/cm, the value 500 µS/cm being excluded, better a conductivity at 20° C. from 5 to 400 µS/cm, still better a conductivity at 20° C. from 30 to 400 µS/cm, for example from 30 to 200 µS/cm, while the liquid compositions for the «CIJ» printing technique have a conductivity at 20° C. of 500 µS/cm or more.

The liquid composition according to the invention has a viscosity at 20° C. from 1 to 25 cPs (mPa·s), preferably from 6 to 25 cPs, while the liquid compositions for the "CIJ" printing technique have a viscosity at 20° C., from 3 to 5 cPs.

The liquid composition according to the invention has a density of 0.8 to 2.5 g/cm$^3$, preferably from 1.2 to 2.5 g/cm$^3$, while the liquid compositions for the «CIJ» printing technique have a density from 0.8 to 1.15 g/cm$^3$.

Surprisingly it was discovered, upon seeking liquid compositions which specifically are suitable for the so-called «SPI» technique, that, specifically because of the so called «SPI» technique for which the liquid compositions according to the invention are designed, these compositions may have advantageous characteristics as compared with liquid compositions for the «DOD» printing technique or for the «CIJ» printing technique.

Thus, it was found, since it is not necessary to electrically charge the drops, very low conductivities of liquid, for example of ink, as compared with liquids such as inks, for «CIJ» are sufficient.

The fact that it is therefore not necessary to add a significant amount of salt for conductivity to the liquid compositions according to the invention, gives wide latitude in the formulation of the liquid compositions according to the invention, which remain printable in a very large viscosity range.

In the «CIJ» technique, liquids of high densities, specific gravities, are not printable since the deflection force of electric origin is insufficient for deflecting drops of great mass, because of an inertia effect.

Conversely, it was demonstrated according to the invention, that in the so-called «SPI» technique, the printed drops are those which are not deflected, and drops with great densities in the range according to the invention are therefore printable.

Advantageously, the liquid composition according to the invention further comprises solid particles, such as pigments.

Preferably, the maximum size of the solid particles is from 2 to 10 µm, preferably from 2 to 5 µm.

The average of maximum size of the particles is measured by means of a laser particle sizer, either by quasi-elastic light scattering as with the Zetasizer Nano-S® from Malvern®, or by light diffraction as with the Mastersizer® from Malvern®.

There again, this is a characteristic which differentiates the liquid composition according to the invention from the liquid compositions for the "DOD" printing technique or the standard «CIJ» printing technique and gives the liquid composition according to the invention advantageous properties as compared with liquid compositions for the "DOD" printing technique or the standard «CIJ» printing technique.

Indeed, the solid particles, such as those contained in the liquid compositions for the standard «CIJ» printing technique have a much smaller maximum size, of less than 2 μm.

In the standard «CIJ» printing technique, the net charge taken by the drops depends on perfect synchronism between the time slot of the charging electric field and the instant when breaking-up occurs. The large particles perturb the breaking-up and make it random, whence a variable loaded charge, whence poor positioning of the drops after deflection and therefore poor printing.

On the contrary in the so-called «SPI» technique, as the net charge of the drops is zero, the accuracy of the breaking-up instant is not critical. Therefore it was demonstrated according to the invention that solid particles, such as pigments, much greater in the liquid compositions for the standard «CIJ» technique may be used in the liquid composition according to the invention without posing any problem during printing and producing markings or treatments of excellent qualities. The maximum size of the solid particles of the liquid composition according to the invention is no longer limited and only by the size of the nozzle.

Moreover, the sedimentation problems observed with large particles become manageable in the compositions according to the invention by adjusting their viscosity. In other words, according to the invention, the «large» solid particles become «printable» while they were not printable with compositions for standard CIJ.

Advantageously, when the liquid composition according to the invention further comprises at least one polymer (for example as a binding polymer), said polymer then has a weight average molecular mass of more than 70,000 Daltons, preferably from 75,000 to 200,000 Daltons, still preferably from 80,000 to 200,000 Daltons.

There again, this is a characteristic which differentiates the liquid composition according to the invention from the liquid compositions for the «DOD» printing technique or of the standard «CIJ» printing technique and gives the liquid composition according to the invention advantageous properties as compared with liquid compositions for the «DOD» printing technique or the «CIJ» printing technique.

Indeed, the polymers which the liquid compositions for the «CIJ» printing technique contain have a molecular mass which does not exceed 70,000.

Similarly to what was discussed above for solid particles of large size, the solid composition according to the invention may contain polymers with very long chains without there occurring problems during printing and giving markings or treatments of excellent qualities.

In other words, according to the invention, the polymers with a very long chain become «printable» while they were not printable with the compositions for standard CIJ.

Advantageously, the solvent comprises one or several solvent compound(s), selected from among the organic solvent compound(s) and water.

Advantageously, said organic solid compound(s) of the solvent is(are) selected, for example, from alcohols, in particular, low molecular weight alcohols, for example, aliphatic alcohols such as ethanol; ketones, preferably low molecular weight ketones; ethers of alkylene glycols; esters of alkylene glycols and esters of alkylene glycol ethers, such as acetates; dimethyl formamide; N-methyl pyrrolidone; acetals; esters; linear or cyclic ethers; aliphatic, cyclic or linear hydrocarbons; aromatic hydrocarbons; and carbonates such as propylene carbonate, ethylene carbonate and dimethyl and diethyl carbonates; and mixtures thereof.

Preferably, this or these solvent compound(s) has(have) the property of dissolving the other ingredients of the ink, notably the binder, the coloring materials, the additives, etc.

The alcohols will preferably be selected from linear or branched aliphatic alcohols from 1 to 8 carbon atoms, such as methanol, ethanol, propanol-1, propanol-2, n-butanol, butanol-2, tert-butanol, etc.

The ketones will preferably be selected from ketones with 3 to 10 carbon atoms, such as acetone, butanone (methyl-ethyl-ketone), pentanone-2 (methyl-propyl-ketone), methyl-3 butanone-2 (methyl-isopropyl ketone) and methyl-4 pentanone-2 (methyl-isobutyl-ketone).

The ethers of alkylene glycols are preferably selected from mono-alkyl ($C_1$-$C_6$ alkyl group) or dialkyl ($C_1$-$C_6$ alkyl groups) alkylene glycol ethers comprising from 1 to 10 carbon atoms in the alkylene chain, preferably these are ethylene or propylene glycol ethers, such as methoxypropanol.

The esters of alkylene glycols and the esters of alkylene glycol ethers are preferably selected from esters of the latter with carboxylic, aliphatic saturated acids with 1 to 6 carbon atoms, such as formic acid, acetic acid, propionic acid, butyric acid, valeric acid and caproic acid.

For example mention may be made of methoxypropyl acetate, butyldiglycol acetate, etc.

The esters are preferably selected from low molecular mass esters such as formates, acetates, propionates or butyrates of alcohols with 1 to 10 carbon atoms.

The acetals are preferably selected from low molecular mass acetals such as ethylal and methylal.

The ethers are preferably selected from low molecular mass ethers such as dioxolane or tetrahydrofurane.

The man skilled in the art may easily identify from among these solvent compounds those which are volatile and those which are non-volatile.

In the composition according to the invention, the solvent generally represents at least 20% by weight of the total weight of the liquid composition, preferably the solvent represents from 30% to 90% by weight, still preferably from 60% to 80% by weight, of the total weight of the liquid composition.

According to a first embodiment, the liquid composition according to the invention is an aqueous composition and the solvent comprises a majority amount (50% by weight or more) by weight of water based on the total weight of the solvent, preferably the solvent comprises 100% of water, i.e. consists of water.

The liquid composition according to the invention may essentially be based on water and only comprise a very small amount of organic solvent compound(s), generally less than 10% by weight, preferably less than 5%, still preferably less than 1% by weight, based on the total weight of the composition of the liquid.

The liquid composition, for example of ink, according to the invention may be essentially free of any organic solvent compounds (0%).

According to a second embodiment, the liquid composition according to the invention is a non-aqueous, organic composition and the solvent comprises a majority amount (50% by weight or more) by weight of one or several organic solvent compound(s) based on the total weight of the solvent, preferably the solvent comprises 100% of one or several organic solvent compound(s), i.e. consists of one or several organic solvent(s).

The liquid composition, for example the ink composition, according to the invention may optionally only comprise a very small amount of water, generally less than 10% by weight, preferably less than 5%, still preferably less than 1% by weight, based on the total weight of the liquid composition.

The liquid composition, for example the ink composition, according to the invention may even be essentially free of water (0% water).

In fact, in this case water present in the composition is only provided water found as an impurity in the various components of the liquid, for example of the ink. The higher the degree of purity of the selected components, the lower will be the water content.

When in the liquid composition according to the invention, there is a small content or absence of water, this promotes the formation of the liquid film, for example of ink, when the binders and other coloring agents of the composition are insoluble in water, thereby improving the resistance and adherence properties of the composition, for example of the ink.

Advantageously (case of a non-aqueous liquid), the solvent may comprise, preferably may consist of one or several organic solvent compound(s) and optionally water provided that the amount of water observes the conditions indicated above, i.e. generally less than 10% by weight, preferably less than 5%, still preferably, less than 1% by weight, based on the total weight of the ink composition, or even 0%.

Advantageously, said organic solvent compound(s) comprise(s) a majority proportion by weight, based on the total weight of the solvent (50% by weight of the total weight of the solvent or more, or even up to 100% by weight of the total weight of the solvent), of one or several volatile organic solvent compound(s), and a minority proportion by weight, based on the total weight of the solvent, of one or several non-volatile organic solvent compound(s).

Preferably, the solvent consists of one or several volatile organic compound(s). By «volatile organic solvent compound», is generally meant that this compound has an evaporation rate of more than 0.5 on the scale where butyl acetate has an evaporation rate equal to 1.

A preferred solvent according to the invention comprises a majority amount by weight based on the total weight of the solvent, preferably consists of one or several solvent compound(s) selected from ketones with 3 to 10 carbon atoms, such as acetone, butanone (methyl-ethyl-ketone or MEK), pentanone-2 (methyl-propyl-ketone), methyl-3 butanone-2 (methyl-isopropylketone) and methyl-4 pentanone-2 (methyl-isobutyl-ketone or MIK).

A particularly preferred solvent comprises a majority amount by weight based on the total weight of the solvent, of MEK, preferably consists of MEK.

Another preferred solvent consists of ethanol.

This preferred solvent may further comprise one or several other solvent compound(s), other than the ketone(s) in a total minority amount by weight, based on the total weight of the solvent, for example in an amount from 0.1% to 20% by weight, preferably from 5% to 15% by weight, based on the total weight of the solvent, in order to optimize the properties of the inks. These minority solvents may be selected from esters, ethers of ethyleneglycol or propyleneglycol, and acetals.

Advantageously, the liquid composition, for example the ink composition according to the invention may further comprise coloring materials such as dyes and pigments.

The dye(s) and/or the pigment(s) may be selected from all the dyes or pigments suitable for the sought use, known to the man skilled in the art, some of these pigments or dyes have already been mentioned above.

It was seen above that the solid particles such as the pigments which the liquid composition according to the invention may optionally contain, may have specific particle sizes.

Generally, the dyes and pigments may be selected from among the dyes and pigments known under the name of «C.I. Solvent Dyes» and «C.I. Pigments» but also from solid particles not referenced in the «Color Index» (C.I.) such as particles of metals or of alloys or of mixtures of metals such as copper and/or silver particles for example, metal oxides particles, ceramics particles, refractory mineral compounds particles, and particles of any other mineral compound.

As examples of the most common pigments and dyes, mention may be made of the C.I. Solvent Black 3, 7, 27, 28, 29, 35, 48, 49, the C.I. Solvent Blue 38, 44, 45, 70, 79, 98, 100, 129, the C.I. Solvent Red 8, 49, 68, 89, 124, 160, 164, the C.I. Solvent Yellow 83:1, 126, 146, 162, the C.I. Solvent Green 5, the C.I. Solvent Orange 97, the C.I. Solvent Brown 20, 52, the C.I. Solvent Violet 9, the dispersions of Pigment Blue 15:1, 15:3, 60, of Pigment Green 7, of Pigment Black 7, of Pigment Red 48:2, 144, 149, 166, 185, 202, 208, 214, 254, of Pigment Violet 19, 23, of Pigment Yellow 17, 83, 93, 139, 151, 155, 180, 191, of Pigment Brown 23, 25, 41, or of Pigment White 6.

The preferred dyes are C.I. Solvent Black 27 and C.I. Solvent Black 29.

The preferred pigments are Pigment White 6, Pigment Black 7, Pigment Blue 60, Pigment Red 202 and Pigment Green 7.

The total amount of dye(s) and/or pigment(s) is generally from 0.05 to 25% by weight, preferably from 1 to 20%, still preferably from 3 to 10% of the total weight of the liquid composition.

Preferably a dye for which solubility in water is the smallest, which is insoluble in water will be selected.

By dye insoluble in water, is generally meant a dye which, added at 1% by weight in demineralized water, does not cause coloration of the water, visible to the naked eye.

Advantageously, the liquid composition according to the invention may further comprise a binder consisting of one or several binding polymer(s).

It was seen above that the polymers which the liquid composition according to the invention optionally contains, may have specific molecular masses.

Advantageously, this or these binding polymer(s) may be selected from (meth)acrylic, vinylic, ketonic, hydroxyaromatic, cellulosic, styrenic, epoxy polymers, polyurethanes, styrene-acrylates, alkoxysilanes, and combinations of two or more of the latter.

Advantageously, the binder represents from 1% to 45% by weight, preferably from 5% to 30% by weight, still preferably from 10% to 20% by weight, of the total weight of the liquid composition according to the invention.

The liquid composition, for example the ink composition, according to the invention may further comprise one or several plasticizer(s) (of the polymer(s) of the binder) for example selected from plasticizers known to the man skilled in the art and selected according to the binder used.

As a plasticizer mention may be made for example of thermoplastic polyurethanes, phthalates, adipates, citrates and esters of citric acid, alkyl phosphates, glycerol, lactic acid, oleic acid, polypropylene glycol, fatty acid triglycerides, levulinic acid; and mixtures thereof.

The plasticizer(s) is (are) generally present in an amount of at least 0.05%, preferably from 0.1 to 20% by weight, of the total weight of the liquid composition, for example of the ink composition.

The composition according to the invention may further optionally comprise at least one conductivity salt, except if one other ingredient of the ink such as a dye, pigment, or other, is itself a ionizable compound such as salt able to provide conductivity when it is dissociated, and gives sufficient conductivity to the ink so that there is no need to add any conductivity salt strictly speaking, this is notably the case of compounds known under the name of «C.I. Solvent Black 27, 29, 35 and 45», already mentioned.

However, it will sometimes be necessary to include, in the liquid composition, for example in the ink composition, according to the invention a conductivity salt strictly speaking, different from the ionizable compounds, such as dyes, pigments and other ingredients mentioned above.

By «conductivity salt», is generally meant a salt which provides electric conductivity to the liquid composition, for example of the ink composition.

This conductivity salt may thus be selected from salts of alkaline metals such as lithium, sodium, potassium, salts of earth-alkaline metals such as magnesium and calcium, and simple or quaternary ammonium salts; these salts being in the form of halides (chlorides, bromides, iodides, fluorides), perchlorates, nitrates, thiocyanates, formates, acetates, sulfates, propionates, trifluoroacetates, triflates (trifluoromethane sulfonates), hexafluorophosphates, hexafluoroantimonates, tetrafluoroborates, picrates, carboxylates and sulfonates etc.

If the markings obtained with the liquid composition, for example the ink composition, according to the invention have to be resistant to water, this or these conductivity salt(s) will be selected from those which are insoluble in water (i.e. generally, for which the solubility in water is less than 0.5% by weight), such as quaternary ammoniums with a fatty chain and hexafluorophosphates or hexafluoroantimonates.

These conductivity salts will therefore be present, if required, in the liquid composition so as to impart to the composition the above conductivity: preferably their amount is from 0.01 to 10% by weight, still preferably from 0.01 to 1% by weight, and better from 0.01 to 0.05% by weight, of the total weight of the liquid composition.

Because the liquid composition according to the invention has conductivity generally below that of liquids, such as inks, for the «CIJ» technique, the amount of conductivity salt optionally added will generally be smaller than in these liquids for «CIJ».

The composition according to the invention may further comprise one or several additives selected from compounds which improve solubility of some of its components, the printing quality, the adherence, or further the control of the wetting of the liquid, for example of the ink on various supports.

The additive(s) may be for example selected from anti-foam agents, chemical stabilizers, UV stabilizers; surfactants, such as Fluorad® FC430 or BYK UV-3500, agents inhibiting corrosion by salts especially by conductivity salts, bactericides, fungicides and biocides, pH regulating buffers, etc.

The additive(s) is (are) used at very small doses, generally less than or equal to 5% and sometimes as low as 0.01%, depending on whether these are anti-foam agents, stabilizers or surfactants.

The invention also relates to the use of the liquid composition, such as an ink composition, according to the invention, as described above, in a printer or printing head applying a printing technique with a binary deflected continuous jet, in which said liquid composition forms, upon (during) printing, drops which are not charged by an electric field, which each have a zero electric charge, which each form a dipole under the effect of an electric field, and which are then deflected by said electric field.

This printing technique is therefore the so-called «SPI» technique.

This technique, this printer and this printing head are as described in documents [1], [2], [3], [4] or [5] mentioned above or in any combination thereof. These are notably the printers and printing heads of these documents taken alone or as a combination as they are explicitly discussed above herein.

The goal of the invention is also a method for marking or treating substrates, supports or objects, for example, porous or non-porous substrates, supports or objects, by spraying on these substrates, supports or objects a liquid composition, such as an ink composition, with a printing technique with a binary deflected continuous jet, wherein said liquid composition forms upon (during) printing drops which are not charged by an electric field, which each have a zero electric charge, which each form a dipole under the effect of an electric field, and which are then deflected by said electric field, characterized in that said liquid composition, such as an ink composition, is the liquid composition, such as an ink composition, according to the invention, as described in the foregoing.

This printing technique is therefore the so-called «SPI» technique.

This technique is as described in documents [1], [2], [3], [4] or [5] mentioned above taken alone or as a combination through processes, methods, printers and printing heads applying this technique. This is notably the printing technique of these documents taken alone or as a combination such as explicitly discussed above herein through the discussion of processes, methods, printers and printing heads applying this technique.

The goal of the invention is further a substrate, support or object, for example, a porous or non-porous substrate, support or object, provided with a marking or a treatment obtained by drying and/or absorption (in the substrate or support) of the liquid composition, such as an ink composition, according to the invention, as described above.

Said marking generally comprises essentially all non-volatile solid materials, such as the dye or pigment of the liquid composition and/or the binder, and it is obtained by evaporation and/or absorption in the substrate, of essentially the totality of the other volatile or migrating constituents of the liquid composition, for example the ink composition, such as the carrier, vehicle.

This substrate may be made of metal, for example, made of aluminium, made of steel (beverage cans); made of glass (glass bottles); made of ceramic; made of a material containing cellulose such as cellophane, paper, optionally coated or glossy paper, cardboard or wood; made of an organic polymer, notably made of a thermoplastic polymer («plastic»), notably as a film, for example selected from PVDCs, PVCs, polyesters, PETs, polyolefins, such as polyethylenes (PE), polypropylenes (PP); made of poly (methyl methacrylate) PMMA also called «Plexiglas»; made of fabric; made of textile; made of natural or synthetic rubber; or made of any other non-porous or porous substance; or made of a composite of several of the previous materials.

Markings, prints, treatments of excellent quality on all the substrates, and in particular on flexible, or even very flexible substrates are obtained.

The invention will be better understood upon reading the following description of embodiments of the invention, given as illustrative and non-limiting examples.

DETAILED DISCUSSION OF PARTICULAR EMBODIMENTS

The invention will be better understood upon reading the following description of embodiments of the invention, given as illustrative and non-limiting examples.

EXAMPLES 1 TO 6

In all these examples, ink compositions according to the invention are prepared.

These ink compositions comprise the ingredients mentioned in Table I, in the proportions mentioned in Table I.

These compositions are generally prepared by simply mixing the ingredients.

In Table I, according to the ink compositions, and when these parameters apply, the average particle size «$Z_{ave}$» (in µm), the conductivity (in µS/cm), the viscosity (in cPs=mPa·s) are also indicated, and finally it is specified whether the inks were suitable or not for printing with the deflected continuous jet technique or with the so-called «SPI» technique.

TABLE I

INK COMPOSITIONS

| Constituents (percentages by mass) | Example 1 | Example 2 | Example 3 | Example 4 |
|---|---|---|---|---|
| Methyl-Ethyl-Ketone | | 1.6 | | |
| Ethanol | 67.26 | | | |
| Dioxolanne | | | 87.3 | |
| Ethyl Acetate | | | | 87.4 |
| 60% Ag—Cu dispersed in an organic solvent (Cima-Nanotech ® Israel) | | 98 | | |
| 75% TiO$_2$ chips dispersed in Neocryl ® B813 | 25.6 | | | |
| Microlith ® Blue A3R-K | | | 5 | |
| Valifast ® Black 3808 | | | | 5 |
| Neocryl ® B817 | 7.04 | | | |
| Vinnol ® E15-45M | | | 5.7 | 7.6 |
| Triethyleneglycol-dimethylether | | | 1.5 | |
| Tetrabutylammonium hexafluorophosphate | | 0.4 | | |
| Sodium Thiocyanate | 0.1 | | | |
| Potassium hexafluorophosphate | | | 0.5 | |
| Average particle size $Z_{ave}$ (µm) | 0.3 µm | <0.1 µm | 0.1 µm | N.A. |
| Conductivity (µS/cm) | 188 | 13 | 74.9 | 117 |
| Viscosity at 20° C. (cPs = mPa · s) | 12.3 | 13.6 | 12.9 | 6.4 |
| Density (g/cm$^3$) | 1.004 | 1.89 | 1.098 | 0.948 |
| Printing by «CIJ» | No | No | No | No |
| Printing by «SPI» | Yes | Yes | Yes | Yes |

60% Ag—Cu from the Cima-Nanotech® company, Israel, is a concentrated dispersion of silver and copper submicron particles in an organic solvent, its density, specific gravity, is very large as compared with what may be projected with a CIJ ink jet.

Microlith® Blue A3R-K is a blue pigment of the C.I. Pigment blue 60 type from BASF®.

Neocryl® B813 and B817 are acrylic resins from DSM®.

Vinnol® E15-45M is a vinylic resin from Wacker®.

Valifast® Black 3808 is a C.I. Solvent black 29.

The indication «No» indicates that the ink is not suitable for printing with the targeted technique such as «CIJ».

The «Yes» indication indicates that the ink is suitable for printing with the targeted technique such as «SPI».

The ink composition according to the invention, of Example 1, is a white ink composition with a very high white pigment concentration and a high viscosity.

The ink composition according to the invention, of Example 2, is an ink composition with a high density, specific gravity, a very low conductivity and a high viscosity.

The ink composition according to the invention, of Example 3, is an ink composition in a solvent not promoting conductivity and having a high viscosity.

The ink composition according to the invention, of Example 4, is an ink composition with low viscosity.

The compositions of Examples 1 to 4 used each in a printer 9040 or 9040 Contrast head G from Markem Imaje®, which is a printer which applies a standard «CIJ» technique, were not able to give satisfactory markings:

For the composition of Example 1, the drops are poorly placed, in a very random way.

For the composition of Example 2, the viscosity is too high, and the conductivity too low, so that both the pressure required for obtaining the nominal jet velocity, and the suitable charge of the drops, cannot be obtained.

For the composition of Example 3, no printing was able to be obtained because of a too high density, specific gravity, and viscosity. The pressure required for obtaining the nominal jet velocity, was not able to be obtained.

For the composition of Example 4, the conductivity is too low, so that the suitable charge of the drops cannot be obtained, a fault occurs, a so-called «phase detection» fault.

On the other hand, the compositions of Examples 1 to 4 gave suitable printings in a prototype printer applying the so called "SPI" technique having a nozzle diameter of 40 µm.

The invention claimed is:

1. A liquid composition comprising a solvent, wherein said liquid composition has all the following characteristics a), b) and c):
   a) a conductivity at 20° C. from 5 to 200 µS/cm;
   b) a dynamic viscosity at 20° C. from 1 to 25 cPs; and
   c) a density from 0.8 to 2.5 g/cm3;
   wherein the solvent comprises a majority amount by weight of one or more organic solvent compound(s) based on the total weight of the solvent, and
   wherein said liquid composition is specifically formulated and adapted for printing with a binary deflected continuous jet printing technique to form drops, wherein each drop:
   i) is not charged by an electric field;
   ii) has a zero electric charge;
   iii) forms a dipole under the effect of an electric field; and
   iv) is deflected under the effect of an electric field.

2. The liquid composition according to claim 1, wherein the organic solvent compound is selected from among alcohols; ketones; ethers of alkylene glycols; esters of alkylene glycols; esters of alkylene glycol ethers; dimethyl formamide; N-methyl pyrrolidone; acetals; esters; linear or cyclic ethers; aliphatic, cyclic or linear hydrocarbons; aromatic hydrocarbons; and carbonates; and mixtures thereof.

3. The liquid composition according to claim 1, wherein the solvent consists of one or more organic solvent compounds.

4. The liquid composition according to claim 3, wherein the solvent consists of one or more volatile organic solvent compounds.

5. The liquid composition according to claim 1, which comprises less than 10% by weight of water.

6. The liquid composition according to claim 5, wherein the solvent consists of one or more organic solvent compound(s) and water.

7. The liquid composition according to claim 6, wherein said organic solvent compound comprises a volatile organic solvent compound and a non-volatile organic solvent compound.

8. The liquid composition according to claim 6, wherein the solvent comprises one or several solvent compound(s) selected from ketones with 3 to 10 carbon atoms.

9. The liquid composition according to claim 8, wherein, the solvent comprises a majority amount by weight based on the total weight of the ketones with 3 to 10 carbon atoms.

10. The liquid composition according to claim 8, wherein the solvent further comprises another solvent compound, other than the ketone.

11. The liquid composition according to claim 5, which is essentially free of water.

12. The liquid composition according to claim 1, which further comprises one or several dyes and/or pigments.

13. The liquid composition according to claim 12, wherein said dye(s) and/or pigment(s) is (are) selected from dyes and pigments known under the name of "C.I. Solvent Dyes" and "CI. Pigments", and from among the solid particles not referenced in the "Color Index" (C.I.).

14. The liquid composition according to claim 13, wherein said «Solvent Dye(s)» is(are) selected from among the C.I. Solvent Black 3, 7, 27, 28, 29, 35, 48, 49, the C.I. Solvent Blue 38, 44, 45, 70, 79, 98, 100, 129, the C.I. Solvent Red 8, 49, 68, 89, 124, 160, 164, the C.I. Solvent Yellow 83:1, 126, 146, 162, the C.I. Solvent Green 5, the C.I. Solvent Orange 97, the C.I. Solvent Brown 20, 52, and the C.I. Solvent Violet 9.

15. The liquid composition according to claim 13, wherein said «C.I. Pigment(s)» is(are) selected from among the dispersions of Pigment Blue 15:1, 15:3, 60, of Pigment Green 7, of Pigment Black 7, of Pigment Red 48:2, 144, 149, 166, 185, 202, 208, 214, 254, of Pigment Violet 19, 23, of Pigment Yellow 17, 83, 93, 139, 151, 155, 180, 191, of Pigment Brown 23, 25, 41, or of Pigment White 6.

16. The liquid composition according to claim 12, comprising all in all from 0.05 to 25% by weight of dye(s) and/or pigment(s) based on the total weight of the liquid composition.

17. The liquid composition according to claim 1, which further comprises a binder consisting of one or several binding polymer(s).

18. The liquid composition according to claim 17, wherein the binding polymer(s) is(are) selected from among (meth)acrylic, vinylic, ketonic, hydroxyaromatic, cellulosic, styrenic, epoxy polymers, polyurethanes, styrene-acrylates, alkoxysilanes, and combinations of two or more thereof.

19. The liquid composition according to claim 17, wherein the binder represents from 1% to 45% by weight of the total weight of the liquid composition.

20. The liquid composition according to claim 17, wherein at least one binding polymer has a weight average molecular mass of more than 70,000 Daltons.

21. The liquid composition according to claim 1, further comprising, one or several plasticizers in an amount of at least 0.05% by weight of the total weight of the liquid composition.

22. The liquid composition according to claim 1, further comprising at least one conductivity salt in an amount from 0.01 to 10% by weight of the total weight of the liquid composition.

23. The liquid composition according to claim 22, wherein said conductivity salt is selected from salts of alkaline metals such as lithium, sodium, potassium, salts of earth-alkaline metals such as magnesium and calcium, and simple or quaternary ammonium salts; these salts being in the form of halides, perchlorates, nitrates, thiocyanates, formates, acetates, sulfates, propionates, trifluoroacetates, triflates (trifluoromethane sulfonates), hexafluorophosphates, hexafluoroantimonates, tetrafluoroborates, picrates, carboxylates and sulfonates.

24. The liquid composition according to claim 1, further comprising one or several additives selected from anti-foam agents; chemical stabilizers; UV stabilizers; surfactants; agents inhibiting corrosion by salts; bactericides, fungicides and biocides; and pH regulating buffers.

25. The liquid composition according to claim 1, which, when it further comprises solid particles, is characterized in that the maximum size of the solid particles is from 2 to 10 µm.

26. The use of the liquid composition according to claim 1, in a printer or printing head applying a printing technique with a binary deflected continuous jet, wherein said liquid composition forms upon printing drops which are not charged by an electric field, which each have a zero electric charge, which each form a dipole under the effect of an electric field, and which are then deflected by said electric field.

27. A method for marking or treating substrates, supports or other objects by spraying a liquid composition with a printing technique with a binary deflected continuous jet, wherein said liquid composition forms upon printing drops which are not charged by an electric field, which each have a zero electric charge, which each form a dipole under the effect of an electric field, and which are then deflected by said electric field, characterized in that said liquid composition is the liquid composition according to claim 1.

28. A substrate, support or object characterized in that it is provided with a marking obtained by drying and/or absorption of the liquid composition according to claim 1.

29. The substrate, support or object according to claim 28, characterized in that the substrate is made of metal; made of glass; made of ceramic; made of a material containing cellulose; made of an organic polymer; made of poly (methyl methacrylate) PMMA; made of a fabric; made of a textile; made of natural or synthetic rubber; or made of any other non-porous or porous substance; or made of a composite of several of the aforementioned materials.

30. The liquid composition according to claim 10, wherein the another solvent compound is selected from the group consisting of esters, ethers of ethyleneglycol or propyleneglycol, and acetals.

31. The liquid composition according to claim 1, wherein said organic solvent compound comprises a volatile organic solvent compound and a non-volatile organic solvent compound.

32. The liquid composition according to claim 9, wherein, the solvent comprises a majority amount of MEK.

33. The liquid composition according to claim 1, wherein the solvent consists of one or several organic solvent compound(s) selected from ketones with 3 to 10 carbon atoms.

34. The liquid composition according to claim 33, wherein the solvent consists of MEK.

* * * * *

UNITED STATES PATENT AND TRADEMARK OFFICE
CERTIFICATE OF CORRECTION

PATENT NO. : 10,266,715 B2
APPLICATION NO. : 15/679559
DATED : April 23, 2019
INVENTOR(S) : Bruno Barbet et al.

Page 1 of 1

It is certified that error appears in the above-identified patent and that said Letters Patent is hereby corrected as shown below:

In the Specification

Column 3, Line 3, "CU" should read --CIJ--

In the Claims

Column 19, Claim 13, Line 33, "CI." should be --C.I.--

Signed and Sealed this
Twentieth Day of August, 2019

Andrei Iancu
*Director of the United States Patent and Trademark Office*